United States Patent [19]

Egle

[11] Patent Number: 4,690,120

[45] Date of Patent: Sep. 1, 1987

[54] EXHAUST GAS RECIRCULATION CONTROL SYSTEM

[75] Inventor: Lawrence E. Egle, Itasca, Ill.

[73] Assignee: Eaton Corporation, Cleveland, Ohio

[21] Appl. No.: 832,902

[22] Filed: Feb. 25, 1986

[51] Int. Cl.$^4$ .......................................... F02M 25/06
[52] U.S. Cl. .................................................. 123/571
[58] Field of Search ...................... 123/568, 569, 571; 251/129.11; 73/4 R

[56] References Cited

U.S. PATENT DOCUMENTS

| | | | |
|---|---|---|---|
| 4,142,495 | 3/1979 | Lahiff | 123/571 |
| 4,290,404 | 9/1981 | Hata et al. | 123/571 |
| 4,318,385 | 3/1982 | Yamaguchi | 123/571 |
| 4,399,798 | 8/1983 | Stoltman | 123/571 |
| 4,528,968 | 7/1985 | Otobe | 123/571 |
| 4,561,408 | 12/1985 | Jenkins | 123/571 |
| 4,566,423 | 1/1986 | Kenny et al. | 123/571 |

Primary Examiner—Willis R. Wolfe, Jr.
Attorney, Agent, or Firm—D. A. Rowe; R. A. Johnston

[57] ABSTRACT

A closed loop system for controlling exhaust gas recirculation (EGR) in an automotive engine. An electrical program command signal from an on-board engine computer/controller actuator through a motor driven circuit, a stepper motor to turn an axial lead screw having a follower thereon connected to a rod for moving the valve poppet to control flow. An orifice plate with differential flow pressure taps is disposed in the EGR passage downstream of a flow control valve poppet. The differential pressure from the taps is sensed by a pressure responsive diaphragm. A stationary proximity sensor using an eddy current principle detects changes in position of the diaphragm and in response thereto generates an electrical feedback signal proportional to EGR flow through the orifice which compared with the command signal to generate a control signal for controlling the stepper motor.

29 Claims, 14 Drawing Figures

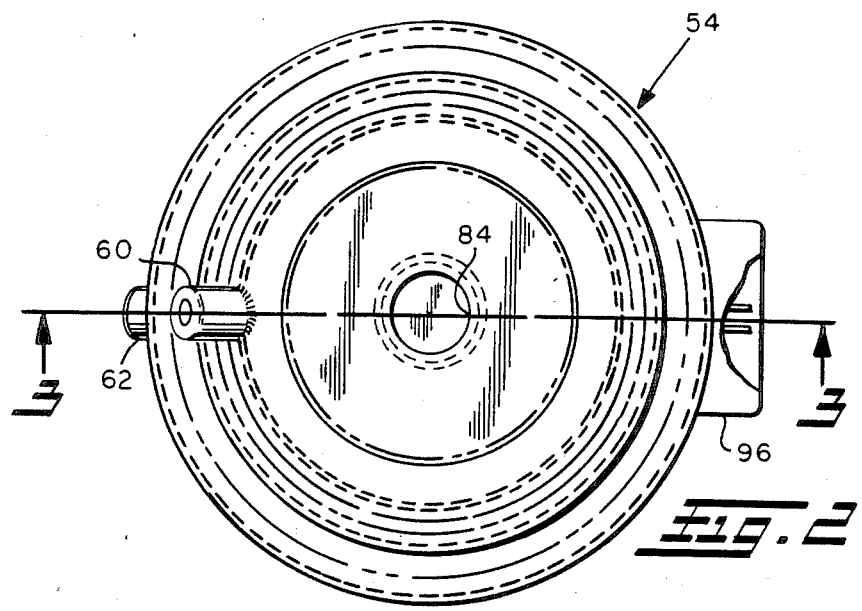
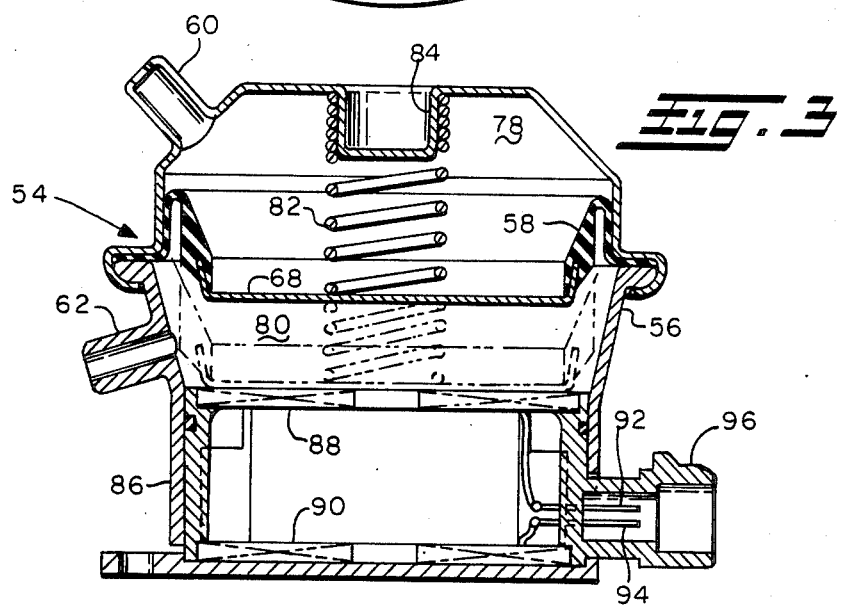
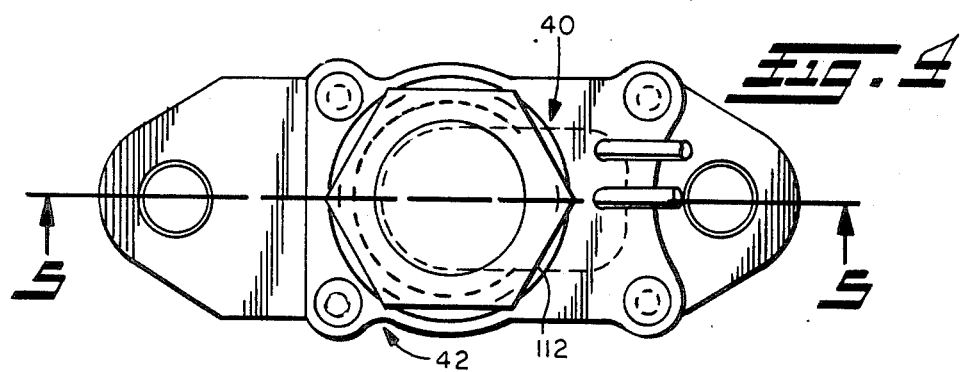

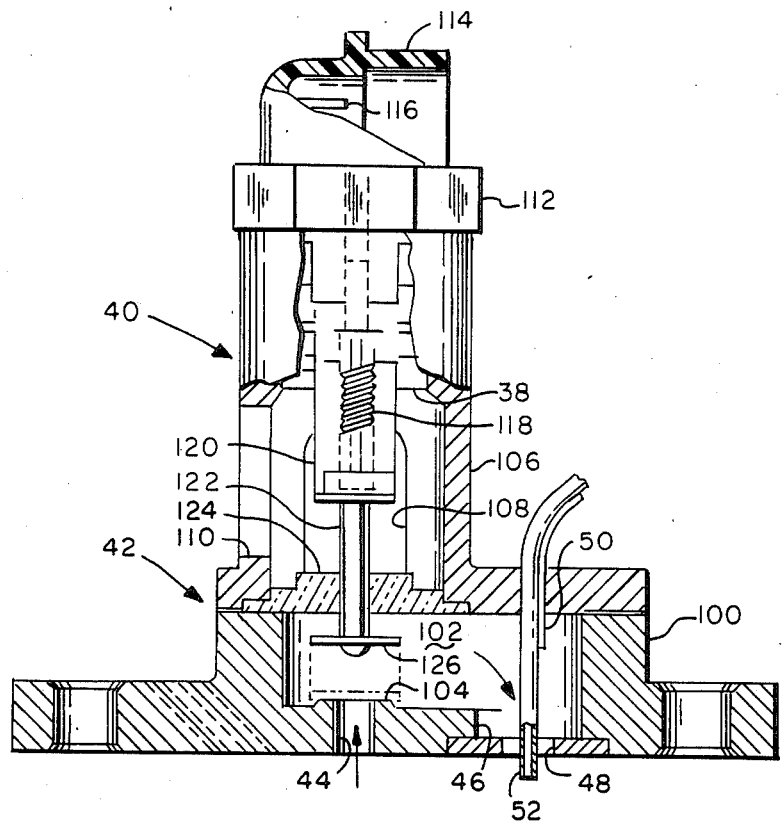
_Fig. 5_
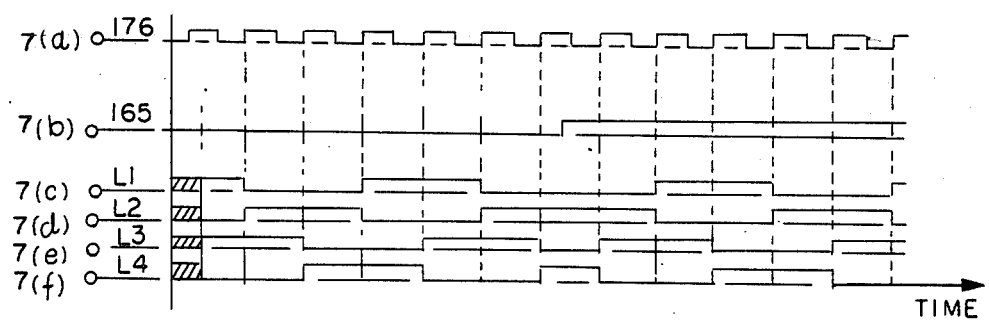
_Fig. 7_

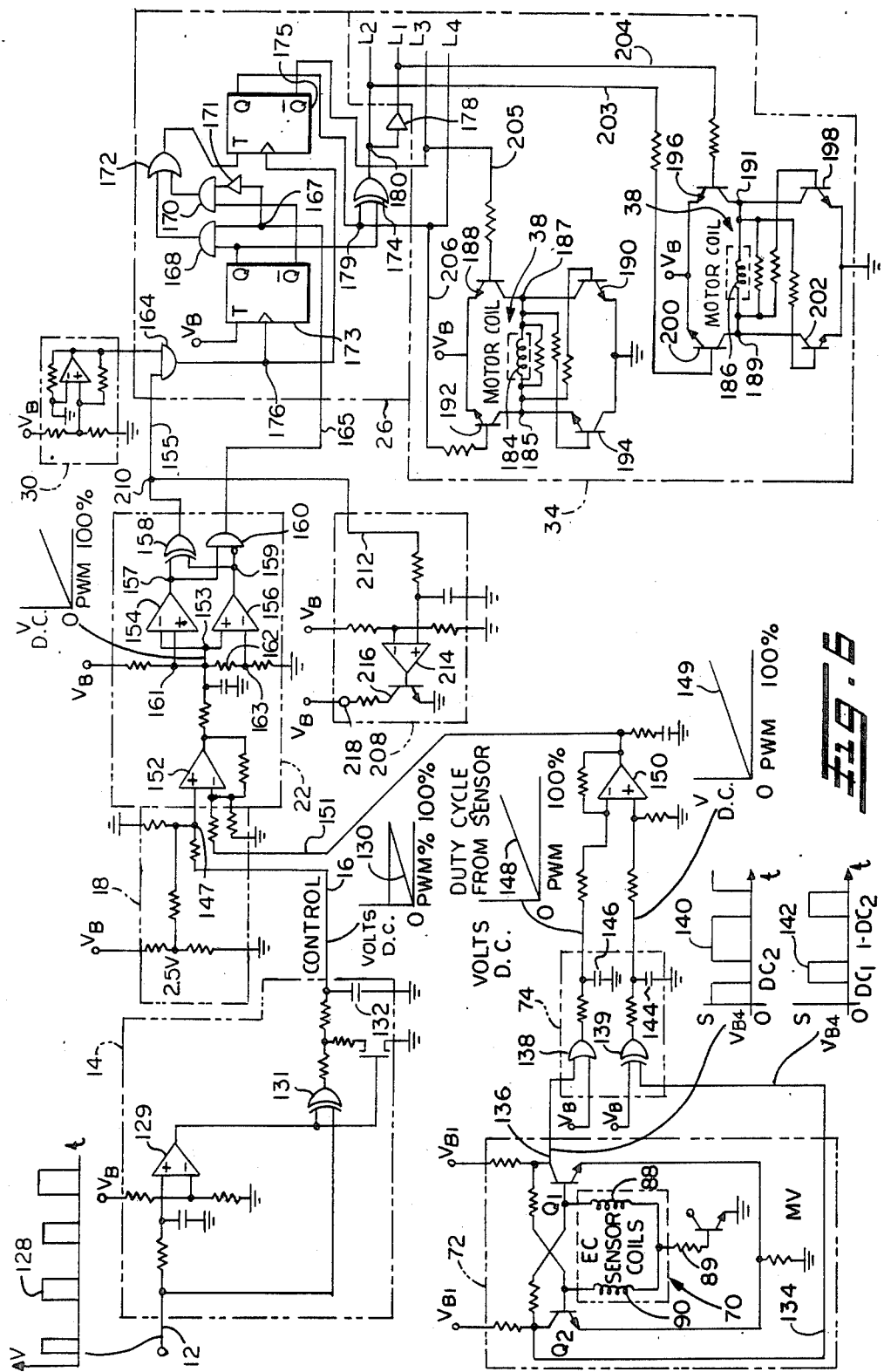

EXHAUST GAS RECIRCULATION CONTROL SYSTEM

BACKGROUND OF THE INVENTION

The present invention relates to the recirculation of exhaust gas in an internal combustion engine and particularly for purposes of reducing harmful emissions from the engine exhaust. In recent years exhaust gas recirculation (EGR) has been controlled in engines employed for automotive vehicles by providing a crossover passage within the engine intake manifold for inter-connecting the exhaust passages with the combustion chamber induction passages. Typically, a valve seat is provided in the passage with a movable poppet valve for controlling flow over the valve seat from the engine exhaust manifold passages into the combustion chamber inlet passages. Opening of the poppet valve is controlled to permit greater or lesser EGR flow depending upon the engine operating conditions and in particular the engine load.

Known systems for controlling the opening of the EGR valve in an engine have employed a pressure responsive diaphragm connected to the poppet valve by means of a guided and insulated operating rod extending externally of the engine intake manifold passage. In certain known EGR control systems, the diaphragm is moved by a fluid pressure signal which may be provided from a pressure tap on the engine exhaust, or from a vacuum signal generated from the engine throttle induction passage or from a vaccum signal controller employing the engine exhaust gas to modify the induction passage vacuum to provide a control signal. Various strategies have been developed to provide the control signal to the pressure responsive diaphragm thereby providing the desired program for EGR flow over the various combinations of engine speed and load experienced in service.

For engines requiring a wide variation of EGR flow and therefor a complicated program control strategy over the range of operating conditions expected in engine service, it has proven costly and difficult to provide a suitable vacuum control signal for acting on the valve power diaphragm because of the opposite nature and wide variation in the available induction vacuum and exhaust back-pressure as generators for the control signal. Furthermore; the trend in modern engine design has been directed away from suction-venturi carburetion and toward throttle-body or multi-point intake port fuel injection in which the injectors are electrically operated. The advent of microprocessors has enabled engine controls to be operated with sophisticated control signals generated by the microprocessor from numerous electrical transducer inputs as for example engine speed, temperature, exhaust gas concentration, intake manifold depression and ambient air temperature. Once a microprocessor has been incorporated in the control system of an engine, it is relatively easy and inexpensive to provide an additional control signal from the microprocessor for providing the desired program strategy for EGR.

Therefore, it has been desired to find a way or means for providing an electrically controllable EGR valve which can operate from a low voltage signal, as for example from a microprocessor, and provide rapid response to changing engine operating conditions and yet provide to a degree of accuracy the desired EGR flow for the sensed engine operating conditions.

Heretofor, it has been proposed to provide a direct current servomotor, operable through a speed reducer to move the EGR poppet operating rod. In such an arrangement it is known to provide a variable potentiometer movable with the poppet operating rod to provide a feedback signal of poppet position for terminating energization of the servomotor. However, this type of arrangement for moving the EGR valve poppet has been found costly to manufacture and difficult to maintain in engine compartment operating environments with a desirable degree of accuracy because of elevated temperatures and contamination from oil and dirt. Furthermore, it has been found difficult to provide a DC servomotor drive for an EGR valve with a desired degree of accuracy where the servomotor drive is exposed to the vibration regime encountered in a typical automotive engine application. In particular, where a feedback potentiometer is employed to control servomotor operation, it has proven to be quite costly to provide a potentiometer capable of giving the desired position accuracy and also capable of withstanding the rigors of the engine compartment operating environment. Thus it has long been desired to provide a way or means of precisely controlling the movement of the EGR poppet valve in an automotive engine application by means of an electrical control signal with a high degree of reliability and low manufacturing cost.

SUMMARY OF THE INVENTION

The present invention provides a unique system for controlling EGR flow in an engine and employs an electrically operated stepper motor to drive an actuator for moving the EGR flow control valve poppet. The system provides closed-loop control without the need for a potentiometer to sense the valve operating position. The control system of the present invention employs an eddy current proximity position transducer employing an eddy current principle to generate an electrical feedback signal to the main control signal generator, which in a modern automotive engine application comprises an on-board microprocessor. The transducer senses a differential fluid pressure signal generated by a control orifice, disposed in the EGR passage downstream of the poppet valve, and pressure taps sensing pressure on opposite sides of the orifice with the sensed pressures applied to opposite sides of a pressure responsive diaphragm. The diaphragm moves a non-magnetic metallic plate disposed in close proximity to one or more sensing coils; and eddy currents generated in the non-magnetic plate effect the inductance of the coils which may be sensed electrically by electronic techniques and the sensed change is utilized to generate the electrical feedback signal to the main control signal generator.

The eddy current pressure transducer provides a high degree of accuracy for sensing slight changes in EGR flow through the orifice; and, therefore yields a high degree of sensitivity to changes in the engine induction pressure or manifold depression which is in turn sensitive to engine loading. Thus, the EGR control system of the present invention provides an electrically controlled EGR valve which operates in a closed loop mode and one in which the feedback signal is generated by changes in the actual EGR flow and applied in the form of a fluid pressure signal to a highly sensitive electrical transducer which in turn generates an electrical feedback signal.

The present invention provides a simple low cost electrical EGR valve controller with a high degree of sensitivity and yet eliminates the need for a potentiometer which has proven troublesome in automotive engine compartment applications. The present invention utilizes a differential fluid pressure signal generated by an orifice in the EGR flow stream to provide an accurate feedback signal indicative of actual EGR flow for attenuating the electrical control signal.

BRIEF DESCRIPTION OF THE DRAWINGS

FIG. 2 is a top view of the pressure transducer employed in the embodiment of FIG. 1;

FIG. 3 is a section view taken along sections 3—3 of FIG. 2;

FIG. 4 is a top view of the EGR valve and actuator employed in the system of FIG. 1;

FIG. 5 is a section view taken along section indicating lines 5—5 of FIG. 4; and FIG. 6 is an electrical schematic of the control system of FIG. 1.

FIGS. 7a-f are timing diagrams for the motor driver logic; and

DETAILED DESCRIPTION

Figure 1:
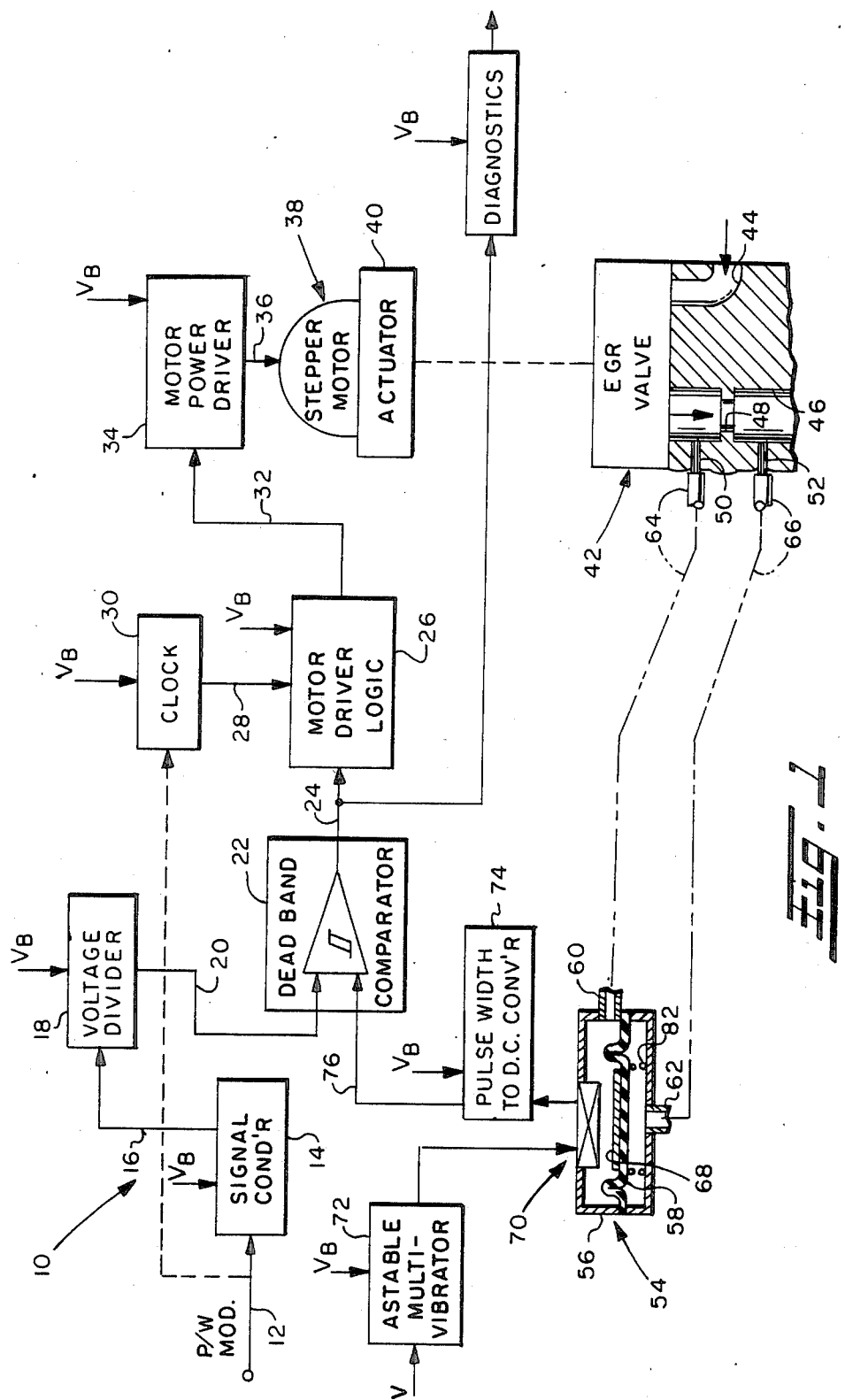
FIG. 1 is a schematic block diagram of the present invention.
Figure 9:
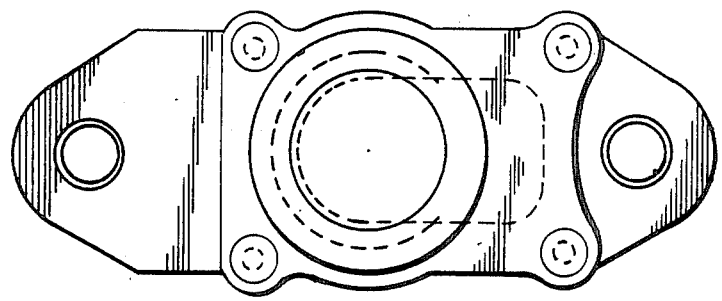

Referring now to FIG. 1, the control system of the present invention is indicated generally at 10 as having an input line 12 operative to receive a pulse width modulated signal from an engine control computer, or microprocessor, which is applied to the input of signal conditioner 14 which provides an output along line 16 in the form of a direct current voltage which varies proportionally to changes in the width of the pulses of the engine control signal. The direct current analog voltage from conditioner A is applied to the input of a voltage divider network 18, the output of which is applied along line 20 to one input of a comparator 22.

The output of comparator 22 is applied along line 24 to the input of motor driver network 26 which receives a timing signal along line 28 from a suitable timing source or clock 30. The clock 30 may optionally be supplied with the pulse width modulated signals from the engine computer as indicated by the dashed line in FIG. 1.

The output of the motor driver logic 26 is applied along line 32 to the input of a motor power driver circuit 34 the output of which is applied along line 36 to a stepper motor 38 operatively connected to drive the linear actuator 40. Actuator 40 is connected mechanically to an EGR valve 42 which has an EGR inlet 44 and an EGR outlet passage 46 which is adapted for connection to the engine combustion chamber inlet.

The EGR outlet passage 46 has provided therein and downstream of the valve, a suitable flow measuring orifice 48 which has adjacent thereto an upstream pressure tap 50 and adjacent thereto a downstream pressure tap 52 which taps sense the pressure differential caused by flow through the orifice 48.

A pressure transducer indicated generally at 54 has a housing 56 having a pressure responsive diaphragm 58 disposed therein and defining closed pressure chambers on opposite sides of the diaphragm 58. A fluid pressure conduit 60 defines a fluid port communicating with one side of the diaphragm 58; and, a fluid conduit 62 defines a pressure port communicating through the housing with the opposite side of the diaphragm 58. Conduit 60 connects to a flexible hose 64 which has the opposite end thereof connected to pressure tap 50 upstream of orifice 58 and the EGR valve. Conduit 62 is connected to a flexible hose 66 which has the opposite end thereof connected to pressure tap 52 on the opposite side of flow orifice 48.

Diaphragm 58 has attached to one side thereof a suitable non-magnetic plate 68, preferably formed of aluminum, and movable with the diaphragm 58 in response to changes in differential pressure there across. A suitable electric sensing coil or coils indicated generally at 70 are provided and disposed within the housing 56 and spaced closely adjacent the plate 68.

A source of alternating current voltage or a series of pulses is provided in the form of an astable multi-vibrator 72 which is connected to the coils 70; and, the coils are also connected to a suitable network 74 for converting the pulses to a DC voltage variable in accordance with the change in characteristics of the pulses. The output of the pulse width-to-DC converter 74 is applied along line 76 to the remaining input of comparator 22.

Referring now to FIGS. 2 and 3 the transducer 54 is shown in greater detail wherein the diaphragm 58 is shown as having an annular configuration with the outer periphery thereof sealed about the housing 56 and the inner periphery sealed about the rim of the plate 68, which has the outer rim thereof upturned for providing a sealing flange for the diaphragm 58. Transducer 54 thus has an upper fluid pressure chamber 78 and a lower fluid pressure chamber 80 formed within the housing 56 by the diaphragm 58 the plate 68. The upper pressure chamber 78 is ported via conduit 60 and the lower pressure chamber 80 is ported through conduit 62. The diaphragm and plate 68 are biased in a downward direction by a spring 82 which has its upper end thereof formed in coils wound in closed end arrangement and received over a hub 84 provided in the upper wall of the housing 56. In the presently preferred practice the upper end of the spring 82 is received over the hub 84 in a slight interference arrangement and is retained thereon by the spring tension of the closed pitch portion of the coils. In the presently preferred practice, spring 82 is initially loosely fit over hub 84, and the transducer is calibrated to a desired spring length, and the spring is held at desired length. The hub 84 is then deformed to expand outwardly to create a press or frictional fit with the inner periphery to the end coils of the spring. The engagement of the expanded hub with the end coils holds the end coils as to thereafter maintain the spring secured onto the hub at the desired calibrated length.

The diaphragm 68 is shown in solid outline in FIG. 3 in the upper extremity of its travel by virtue of a lower pressure in chamber 78 than in chamber 80; and, the diaphragm and spring are shown in dashed outline in the lower extremity of travel wherein the pressure differential between chamber 78 and chamber 80 is zero.

The housing 56 has a lower portion 86 which defines a chamber having mounted therein at least one and preferably two inductance coils 88 and 90. The inductance coil have their electrical leads connected to R89 and transistors $Q_1$ and $Q_2$ of multi-vibrator 72.

The second coil 90 provides a reference signal condition for comparison with the signal from coil 88 has influenced by the motion by plate 68 on diaphragm 58 and can, therefore, provide ambient temperature compensation.

Referring now to FIGS. 4 and 5, the EGR valve 42 and actuator 40 are shown as an assembly with the valve 42 having a valve block 100 defining therein the valving chamber 102 in which is disposed a valve seat 104 which is connected to the exhaust inlet passage 44. The chamber 102 also communicates with exhaust outlet passage 46 having disposed therein the flow measuring orifice 48. The upstream pressure tap 50 comprises a tube received through the wall of the valve block 100 and terminating in the chamber 102 above the orifice 48. The downstream pressure tap 52 comprises a tube disposed adjacent tube 50 and extending through the wall of the valve block 100 and through the orifice 48 to the region downstream thereof. The valve block 100 has attached thereto and extending upwardly therefrom the support structure 106 for actuator 40.

The support structure 106 is ventilated by a plurality of spaced cutouts 108, 110 to permit air circulation for cooling in the structure as mounted thereon the stepper motor 38. The upper end of the structure 106 is closed by a threaded plug 112 having a prefereably hexagonal configuration and provided with an electrical connector shell 114 through which extends suitable electrical terminals such as 116 adapted for external connection thereto terminals 116 are connected by suitable leads (not shown) through the plug 112 to the terminals (not shown) of stepper motor 38. The terminals 116 are adapted for connection to the line indicated by numeral 36 in FIG. 1 to receive a signal input from the motor power driver 34.

The output shaft of the stepper motor 38 is connected to an axial lead screw 118 which is received in a correspondingly threaded follower 120 which is guided by a suitable keying mechanism (not shown) to permit axial movement, but not rotation with respect to the structure 106. The lead screw follower 120 has the lower end thereof connected to a valve operating rod 122 which extends downwardly through a guide bushing and seal 124, which is formed of suitable heat resistant material also having satisfactory low friction and sealing properties to permit the operating rod 122 to slide freely therein and seal chamber 102. A valve member, preferably in the form of a generally flat poppet disk 126, is attached to the lower end of the rod 122 and is sized and configured to provide a fluid pressure seal when in contact with the valve seat 104.

Figure 8:
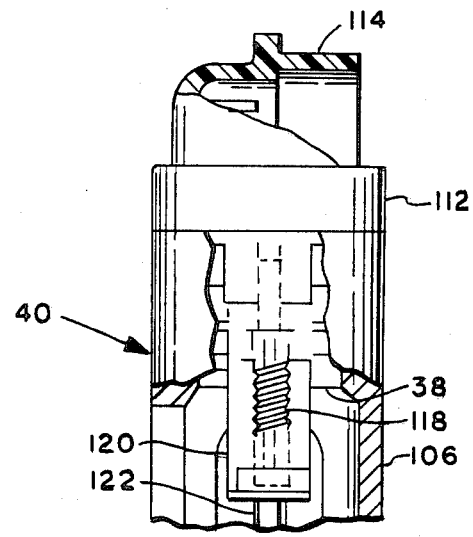
FIG. 8 is a portion of a view similar to FIG. 5 of an alternative actuator construction.

Although the valve actuator means has been described herein with respect to the presently preferred practice as comprising a stepper motor, other types of electrical valve actuators may be employed, as for example, a DC motor with a gear train or a solenoid actuator. Referring now to FIG. 8, an alternate embodiment of the valve actuator is indicated generally at 40 wherein the upper support structure 106 has a hollow tubular configuration with the motor 38, lead screw 118, follower 120 and rod 122 received therein with the connector 114 attached. The subassembly is retained therein by deforming, as for example by crimping the upper end of the structure 106 over the motor mounting base 112.

It will be understood that in operation, energization of the stepper motor rotates lead screw 118 causing follower 120 to move axially and guide the operating rod 122 for moving the poppet valve an amount proportional to the rotation of the axial lead screw 118. The stepper motor linear actuator including lead screw 118 and follower 12 may be obtained from a commercially available source as for example a stepper motor made by Air Pax Corporation Cheshire Division, Cheshire Industrial Park, Cheshire Conn. 06410 and bearing manufacturer's model number 92136; however, it will be understood that any commercially available stepper motor having appropriate operating voltage torque output and compactness may be employed.

Referring now to FIG. 6, the electrical schematic for the system of claim 1 is shown wherein the input line 12 from the on-board engine controller provides a pulse width modulated signal indicated at 128 which is applied to one input of a comparator amplifier 129 the remaining input of which is supplied with the on-board power supply $V_B$; and, the output of comparator 129, through archive-OR device 131, is operative to charge a capacitor 132 during the "ON" time of a pulse. The voltage generated on the capacitor is proportional to the "ON" time thereby providing analog signal characteristics on line 16 at the output thereof as indicated graphically at 130 in FIG. 1. The DC voltage of signal 130 is proportional to and increases with increasing "ON" time of the signal 128.

The astable multi-vibrator 72 has a switching device $Q_1$ with its base connected through sensor coil 88 and through a suitable resistor 89 to ground. Multivibrator 72 has a second switching device $Q_2$ with its base series connected through coil 90 and a suitable resistor 89 in common with coil 88, and to ground. The emitters of $Q_1$ and $Q_2$ are commonly grounded through a resistor and the collectors receive a suitable operating voltage $V_B$. The collector voltage of $Q_2$ is applied along line 134 to one input of an exclusive OR divice 139; and, the collector voltage of $Q_1$ is applied long line 136 to one input of a second exclusive OR device 138.

The signal from $Q_1$ on line 136 is indicated graphically at 140; and, the signal from $Q_2$ on line 134, which is the converse or supplement of the signal on line 136, is indicated at 142. The sum of the signals 140 and 142 thus comprises a complete period or duty cycle of the output of the astable multi-vibrator 72. The output of each of the exclusive OR devices 139, 138 is applied respectively through resistor to individually charge respectively capicitor 144, 146; and, the remaining input of each of the exclusive OR devices 139, 138 is connected to the operating supply voltage $V_B$. The output of the devices 139, 138 thus comprises the output of the pulse width-to-DC converter 74. The output of converter 74 is in the form of dual analog DC voltage 198 increasing with increased pulse width of the signal on line 136 from the collector voltage of $Q_1$ and an alalog DC voltage 149 from the output of exclusive OR 139 for the pulses 142 from the collector voltage of $Q_2$.

The signal 148 is applied to the positive input of a differential amplifier 150 and the signal 149 is applied to the negative input thereof; and, the output of amplifier 150 and the signal 149 is applied to the remaining input. The output of amplifier 150 is applied to one input of an operational amplifier 152 employed in the dead band comparator network 22.

The output of signal conditioner 14, in the form of analog DC voltage signal 130, is applied to junction 147 and to the remaining negative input of amplifier 152. Junction 147 receives the output of voltage divider 18, preferably chosen to 2.5 volts, to provide a reference-level signal to the amplifier 152.

The amplified analog DC voltage from amplifier 152 is applied to junction 153 which is connected to the negative input of comparator 154 and also to the positive input of a comparator amplifier 156. The positive input of comparator amplifier 154 is connected to junction 161 which forms a part of a voltage divider and is biased to a suitable operating voltage $V_B$ as for example, 2.5 volts DC. Junction 161 is also connected through a dead-band dropping resistor 162 to junction 163 which is grounded through a suitable resistor. Junction 163 is also connected to the negative terminal of comparator 156. The dead band resistor 162 is chosen so as to give a desired dead band voltage drop between comparator amplifiers 154 and 156; and in the presently preferred practice is in the amount of plus or minus one-tenth volt DC. It will be understood however, that if faster response or a greater degree of accuracy of flow control is required, the dead band resistor 162 may be chosen to give a lesser voltage drop for effecting finer incremental control operations.

The output of comparator amplifier 154 is applied through junction 157 to one input of an excusive OR 158; and, junction 157 is also connected to one input of AND device 160. The output of comparator output 156 is applied through junction 159 to the remaining input of exclusive OR 158 and is also inverted and applied to the remaining input of AND device 160.

Referring now to Table I which is a the truth-table, the logic of comparator amplifier 154 is shown wherein it is seen for the preferred dead band of plus or minus one-tenth volt DC, the output of the device is shown for different voltages applied to the positive and negative inputs of the comparator amplifier. Similarly with reference to Table II which is a truth table, the logic is shown for comparator amplifier 156 for different voltage levels applied to the positive and negative inputs thereof. From Tables I and II it will be understood that the comparator amplifiers are operative to conduct only when the input voltages are outside of the dead band.

The output of exclusive OR 158 is applied along line 155 to the motor driver logic network 26; and, the output of AND device 160 is applied along line 165 to a second input of the network 26.

TABLE I

| V 153 | V 161 | 154 |
|---|---|---|
| 2.61 | 2.60 | 0 |
| 2.59 | 2.60 | 1 |
| 2.39 | 2.60 | 1 |

TABLE II

| V 153 | V 163 | 156 |
|---|---|---|
| 2.41 | 2.40 | 1 |
| 2.39 | 2.40 | 0 |
| 2.61 | 2.40 | 0 |

TABLE III

| 157 | 159 | 158 | 160 |
|---|---|---|---|
| 0 | 0 | 0 | 0 |
| 0 | 1 | 1 | 0 |
| 1 | 1 | 0 | 0 |

The operational logic of the exclusive OR device 158 and the AND device 160 is shown in Table III in truth table form for the various states of the inputs thereto which comprise the outputs of comparator amplifiers 154 and 156. From Table III it will be seen from the entries in rows 2 and 3 that the signal along line 155 from exclusive OR 158 is high only when the comparator amplifiers 154, 156 are sensing voltages from line 151 which are outside of the dead-band.

In the presently preferred practice, it has been found satisfactory to employ for the motor driver logic 26 and the motor power driver circuit 34 a commercially available solid state device bearing the designation L-293; or, alternatively an AIRPAX device bearing the manfuacturer's identification SAA-1027. However, where such devices are not available, the circuits shown in FIG. 6 and hereinafter described may be employed for the logic 26 and driver curcuit 34.

The motor driver logic network 26 comprises an AND device 164 having one input connected to line 155 and the other input receiving pulses from the clock 30. The output of AND device 164 is connected to junction 176 which is connected to the clock input of latch network 173; and, junction 176 is also connected to the clock input of latch network 175. The signal along line 165 from the dead-band comparator network 22 is connected to one input of an AND device 168 which has the remaining input connected to the Q output of the latch 173; and, the output of AND device 168 is connected to the input of an OR device 172. The Q output of latch 173 is applied to one input of an AND device 170 which has the remaining input connected through an inverter from junction 167 on line 165. The output of AND device 170 is connected to the remaining input of OR gate 172. The output of OR gate 172 is connected to the toggle or reset input of latch network 175.

The Q output of latch network 175 is connected to junction 179 which is also connected as the $L_4$ output of network 26. Junction 179 is also connected to one input of an exclusive OR device 174 which has its output connected to junction 180. Junction 180 is connected as the $L_2$ output of network 26 and is also connected through an inverter 178, the output of which comprises the $L_1$ output of the network 26. The Q output of network 175 is connected to comprise the $L_3$ output of the network 26.

The motor power driver network 34 for the motor 38 comprises a first motor coil 184 connected between junctions 185 and 187. Junction 187 is connected to the collectors of a pair of power transistors 188, 190. Junction 185 is connected to the collectors of another pair of power transistors 192 and 194. Junction 185 is also connected through a resistor to the base of transistor 190; and, junction 187 is connected through a resistor to the base of transistor 194. The emitters of transistors 188 and 192 are biased by the operating voltage $V_B$; and, the emitters of transistors 190 and 194 are commonly grounded. The base of transistor 188 is connected through a resistor along line 205 to driver logic output $L_3$; and, the base of transistor 192 is connected through a resistor along line 206 to the driver logic output $L_4$.

Similarly a second motor coil 186 is connected between junctions 189 and 191. Junction 191 is connected to the collectors of another pair of power transistors 196 and 198. Junction 189 is connected to the collectors of a pair of power transistors 200, 202; and, junction 189 also connected to the base of transistor 198 through a suitable resistor. Junction 191 is similarly connected through a suitable resistor to the base of transistor 202. The emitters of transistors 200 and 196 are connected to receive a supply voltage $V_B$. The emitters of transistors 198 and 202 are commonly grounded. Motor driver logic output $L_2$ is connected through a resistor along line 203 to the base of transistor 200. The base of transistor 196 is connected through a resistor along line 204 to the output $L_1$ of the motor driver logic.

When a signal pulse is received on driver logic output $L_1$ by transistors 196, 198, 200, 202 coil 186 is energized for a single step of clockwise motor rotation. When a signal pulse is received on motor driver logic output $L_3$, coil 184 is energized by transistors 188, 190, 192 and 194 for a single step of counterclockwise rotation of the motor 38.

Referring to FIG. 6, when the signal from $L_1$ along line 204 goes from low to high, $L_2$ by definition goes from high to low, transistor 196 turns OFF and simultaneously transistor 200, turns ON. When a voltage appears at the collector of transistor 200 current flows through base of transistor 198 causing main current flow through transistor 200 through coil 186 and transistor 198 to ground. The voltage at the collector of transistor 198 goes low which turns transistor 202 OFF and no current flows through transistors 202 and 196. At the trailing edge of the $L_1$ pulse, $L_1$ goes low and $L_2$ goes high causing transistor 200 and 198 to turn OFF and 196 and 202 to turn ON. It will be understood that the process is repeated with the next pulse on line 204. The stepper motor is caused to rotate one step during each transition of $L_1$. It will be further understood that the operation of the power driver transistors 188, 190, 192 and 194 for motor coil 184 is identical for a pulse from $L_3$ on line 205 and detailed description thereof is omitted for brevity.

The operational logic of the motor driver network 26 will be understood more readily with reference to FIG. 7. When referring to FIG. 7 it will be understood that $L_1$ is equal to $L_2$ and $L_4$ equals $L_3$.

Referring to FIG. 7, a timing diagram for the logic of the motor where it will be understood that the output characteristics of FIG. 7 represent the condition that the signal on line 155 from exclusive OR 158 is high, thereby enabling AND gate 164 to conduct the clock pulses to junction 176.

The clock or timing pulses at junction 176 are shown as a basis of time reference along the graph in FIG. (7a). FIG. (7b) shows the command signal from AND gate 160 along line 165 for a typical condition wherein the signal is caused to change by a change in the conditions of EGR flow as sensed by transducer 70 and a change of signal along line 151.

With reference to FIGS. (7c) through (7f) the outputs, $L_1$, $L_2$, $L_3$ and $L_4$ of driver logic network 26 are shown as they are sequenced by the succession of clock pulses shown in FIG. (7a). It will be understood that $L_1$ and $L_2$ are by intention inverted with respect to each other and $L_3$ and $L_4$ are inverted with respect to each other.

From FIGS. (7c) and (7d) it will be seen that the change in $L_1$ with the passing of each successive two clock pulses causes the stepper motor drive transducers 196, 198, 200 and 202 to switch current to the motor coil to effect a step of motor rotation. The sequence being restarted upon a change in a command signal on line 165. Similarly, with reference to FIGS. (7e) and (7f) it will be seen that the motor driver logic output $L_3$ changes state with the passage of each two successive clock pulses with the sequence being restarted upon the change of state of the signal along line 165 as indicated in FIG. (7b). The change in state of driver logic output $L_3$ causes the transistors 192, 194, 188 and 190 to effect a single step of motor rotation in the direction opposite that caused by energization of the coil 186 by motor logic output $L_1$.

In operation, when the comparator amplifiers 154 and 156 detect a difference of the signal on line 151 outside of the predetermined dead-band, signals are applied along either 155 or 165 to effect clockwise or counterclockwise rotation of the stepper motor to move the valve operating rod 122 for increasing the opening or closing of the poppet valve 126. The signal on line 151 is generated as a result of the differential pressure sensed in the conduits 50 and 52 in the EGR passage and represents a measurement of the flow of EGR. This pressure differential is sensed by the proximity sensor 70 which acts as a transducer and generates the electrical signal applied along line 151. The differential pressure signal provided along line 151 is then compared with the control signal 128 from the engine computer to produce the desired amount of EGR flow for the instantaneous operating conditions.

If desired, an optional diagnostic circuit 208 may be employed, which is connected to junction 210 on line 155 and received the output signal from exclusive OR 158 along line 212. This circuit 208 employs a comparator 214 having the positive input thereof connected to line 212, with the supply voltage $V_B$ connected to the negative input terminal.

The output of comparator 214 is applied to the base of a transistor switch 216 which has its emitter grounded and its collection connected through an indicator light 218 to the supply voltage $V_B$. In operation, when the signal from exclusive OR 158 at junction 210 goes low, comparator 214 conducts causing transistor 216 to conduct and illuminate light 218 thereby indicating a fault.

The present invention provides a unique control system for exhaust gas recirculation in an engine by utilizing a differential pressure flow sensor in the EGR passage to provide a feedback signal for closed loop control. The fluid pressure feedback signal is applied to a pressure responsive diaphragm, the change in position of which is sensed by an electrical proximity sensor which generates an electrical feedback signal. The electrical feedback signal is then compared with a command control signal for driving a stepper motor to position the EGR flow control valve according to the difference in compared signals. The present invention thus provides for closed loop control of an EGR flow control valve where the feedback signal comprises a differential pressure measurement of the recirculated exhaust gas flow. The present invention employs an eddy current proximity sensing technique to convert the differential pressure feedback signal to an electrical signal.

Although the invention has hereinabove been described with respect to the hereinabove described and illustrated embodiment, it will be understood that modification in variations of the invention may be made and the invention is limited only by the following claims:

I claim:

1. A system for controlling exhaust gas recirculation (EGR) in an internal combustion engine:
   (a) base means defining an exhaust gas inlet port, an exhaust gas outlet port and an EGR passage communicating said inlet port with said outlet port, said base means adapted for attachment to an exhaust passage and a combustion chamber inlet passage of an engine;
   (b) flow valve means disposed in said passage and including a valve seat and poppet member operable upon movement with respect to said seat for controlling EGR flow between said inlet and said outlet;

(c) actuator means operable upon receipt of an electrical control signal to move said poppet, said actuator means including:
 (i) a stepper motor,
 (ii) an axial lead means operatively rotated by said stepper motor,
 (iii) follower means guided for axial movement, and operably connected to move said poppet in response to rotation of said lead means;

(d) plate means disposed in said EGR passage between said seat and said outlet port and defining a flow measuring orifice;

(e) pressure tap means operative to sense the pressure in said passage on the upstream and downstream sides of said orifice;

(f) transducer means operative in response to the pressure in said pressure tap means to provide said electrical control signal for said stepper motor, said transducer means including,
 (i) pressure responsive means operative to move in response to changes in the pressure differential across said orifice sensed by said pressure tap means,
 (ii) a non-magnetic member disposed for movement with said pressure responsive means,
 (iii) inductive means disposed spaced closely adjacent said pressure responsive means, said inductive means operative upon electrical energization to generate eddy currents in said non-magnetic member, said eddy currents operative to alter the inductance of said inductive means in accordance with movement of said non-magnetic member,
 (iv) circuit means operative to detect said change in inductance and emit a change signal representative thereof, and,
 (v) driver circuit means responsive to said change signal and operative to provide a control signal for indexing said stepper motor by an amount corresponding to the change in position of said pressure responsive means.

2. A system for controlling exhaust gas recirculation (EGR) in an internal combustion engine comprising:
(a) base means defining an EGR passage having an inlet port and an outlet port, said ports adapted for connection respectively to an exhaust passage an an inlet passage in an engine;
(b) EGR flow valve means disposed in said passage and including a valve seat and a valve member moveable with respect to said valve seat for controlling EGR flow between said base means inlet and outlet ports;
(c) electrically energizeable actuator means operative, upon receipt of a control signal, to move said valve member for controlling EGR flow;
(d) differential pressure flow sensing means disposed in said EGR passage downstream of said valve seat;
(e) pressure transducer means connected to said differential flow pressure sensing means and operative to provide an electrical signal indicative of the EGR flow in said passage, said transducer having,
 (i) pressure responsive means moveable in response to changes in said sensed differential flow pressure,
 (ii) proximity sensor means disposed in spaced relationship to and pressure responsive means and operative to sense said change in position of said pressure responsive means and to provide an electrical position signal; and,
(f) driver circuit means operative to provide said actuator means control signal in response to said position signal.

3. A method of suspending a coiled spring at a calibrated length comprising the steps of:
(a) inserting a general cup shaped member in the coils of one end of the spring in a sliding fit;
(b) moving and holding the free end of said spring to a desired calibrated length for said spring; and,
(c) deforming said cup shaped member outwardly into contact with the inner periphery of said coils for retaining said spring on said cup shaped member and at said calibrated length.

4. A system for controlling exhaust gas recirculation (EGR) in an internal combustion engine comprising:
(a) base means defining an EGR passage having an inlet port and an outlet port, said ports adapted for connection respectively to an exhaust passage and an inlet passage in an engine;
(b) EGR flow valve means disposed in said passage and including a valve seat and a valve member movable with respect to said valve seat for controlling eGR flow between said base means inlet and outlet ports;
(c) electrically energizeable actuator means operative, upon receipt of a control signal, to move said valve member for controlling EGR flow;
(d) differential pressure flow sensing means disposed in said EGR passage downstream of said valve seat;
(e) pressure transducer means connected to said differential flow pressure sensing means and operative to provide an electrical signal indicative of the EGR flow in said passage, said transducer having,
 (i) pressure responsive means movable in response to changes in said sensed differential flow pressure,
 (ii) means disposed to sense said changes in said pressure responsive means and to provide an electrical flow pressure feedback signal; and,
(f) driver circuit means operative to provide said actuator means control signal in response to said feedback signal.

5. The system defined in claim 4, further comprising diagnostic circuit means operable to sense said control signal and provide an alarm indication in the event of malfunction of said control signal.

6. A system for controlling exhaust gas recirculation (EGR) in an internal combustion engine:
(a) base means defining an exhaust gas inlet port, an exhaust gas outlet port and an EGR passage communicating said inlet port with said outlet port;
(b) flow valve means disposed in said passage an including a valve seat and valve member operable upon movement with respect to said seat for controlling EGR flow between said inlet and said outlet;
(c) means defining a flow measuring orifice disposed in said EGR passage between said seat and said outlet;
(d) pressure cap means operative to sense the pressure in said EGR passage closely adjacent the upstream and downstream sides of said measuring orifice;

(e) pressure responsive means including a non-magnetic member moveable in response to the difference in pressure sensed by said upstream and downstream taps;

(f) inductance circuit means including an inductor disposed spaced closely adjacent said pressure responsive means, said circuit means operable, upon connection to a source of electrical power, to sense the change in the effective inductance of said inductor as affected by movement of said pressure responsive means and provide a control signal having certain characteristics thereof indicative of the movement to said pressure responsive means;

(g) a stepper motor operative to rotate a predetermined amount in response to a predetermined characteristic of said control signal;

(h) helical means operatively connected to move said valve member in response to rotation of said stepper motor.

7. The system defined in claim 6, wherein said helical means comprises an axial screw.

8. The system defined in claim 6, wherein said base means includes hollow support structure for said stepper motor having a passage formed therethrough for circulation of air for cooling.

9. The system defined in claim 6, wherein said pressure responsive means is disposed remote from said base means and said pressure tap means includes flexible hose means interconnecting said upstream and downstream orifice taps with said pressure responsive means.

10. The system defined in claim 6, wherein said helical means is disposed co-axially with respect to said valve seat.

11. A system for controlling exhaust gas recirculation (EGR) in an internal combustion engine comprising:
(a) base means defining an EGR passage having an inlet port and an outlet port, said ports adapted for connection respectively to an exhaust passage an an inlet passage in an engine;
(b) EGR flow valve means disposed in said passage and including a valve seat and a valve member moveable with respect to said valve seat for controlling EGR flow between said base means inlet and outlet ports;
(c) electrically energizeable actuator means operative, upon receipt of a control signal, to move said valve member for controlling EGR flow;
(d) differential pressure flow sensing means disposed in said EGR passage downstream of said valve seat;
(e) pressure transducer means connected to said differential flow pressure sensing means and operative to provide an electrical signal indicative of the EGR flow in said passage, said transducer having,
(i) pressure responsive means moveable in response to changes in said differential flow pressure,
(ii) inductance means disposed spaced closely adjacent said pressure responsive means, said inductance means having the effective inductance thereof altered by the change in position of said pressure responsive means in response to changes in said differential pressure,
(iii) detecting circuit means operative to sense said change in said inductance and provide an electrical position signal; and,
(f) driver circuit means operative to provide said actuator means control signal in response to said position signal.

12. The system defined in claim 11, wherein said driver circuit means is housed commonly with said electrically energizeable actuator means.

13. The system defined in claim 11, wherein said differential pressure flow sensing means comprises means defining a metering orifice with an upstream and downstream pressure tap adjacent said orifice.

14. The system defined in claim 11 wherein said electrically energizeable actuator means includes a stepper motor and an axial lead screw rotated thereby said lead screw having a follower thereon connected to valve member.

15. The system defined in claim 11, wherein said valve means and said electrically energizeable actuator means are mounted on said base means.

16. The system defined in claim 11, wherein said valve means and said electrically energizeable actuator means are mounted on said base means and said differential pressure flow sensing means is housed remotely from said base means.

17. The system defined in claim 11, wherein said differential pressure flow sensing means includes means defining a flow metering orifice with an upstream and a downstream pressure tap adjacent said orifice; and, said pressure responsive means is disposed remotely from said base having flexible conduit means connecting to said upstream and downstream pressure taps thereto.

18. The system defined in claim 11 wherein said pressure responsive means includes a flexible diaphragm having a non-magnetic metallic plate attached thereto for movement therewith; and, said inductance means includes a coil of electrically conductive material.

19. The system defined in claim 11, wherein said electrically energizeable actuator means is mounted on an open-lattice frame distal said base means, said frame permitting air circulation therethrough for thermally isolating said actuator means from said base means.

20. A system for controlling exhaust gas recirculation (EGR) in an internal combustion engine comprising:
(a) base means defining an EGR passage having an inlet port and an outlet port, said ports adapted for connection respectively to an exhaust passage and an inlet passage in an engine;
(b) EGR flow valve means disposed in said passage and including a valve seat and a valve member moveable with respect to said valve seat for controlling EGR flow between said base means inlet and outlet ports;
(c) electrically energizable actuator means operative upon receipt of an electrical control signal to move said valve member;
(d) means defining a flow measuring orifice disposed in said EGR passage downstream of said valve seat; and,
(e) pressure transducer means operably connected to sense EGR flow differential pressure across said orifice, said transducer means having,
(i) housing means defining a pressure chamber connected to receive said sensed differential pressure and having a pressure responsive means operably responsive to said pressure differential to move relative to said base means,
(ii) sensing circuit means including a stationary inductance means mounted on said housing means and spaced closely adjacent said pressure responsive means, said sensing circuit means operative to detect changes in the inductance of said inductor in response to movement of said pressure responsive means and to emit an electrical signal indicative of said movement, (iii) driver circuit means operative to provide a control signal to said actuator means for effecting movement of said valve member, said driver circuit means operatively connected to receive said sensing circuit signal as a feedback signal for attenuating said control signal.

21. The system defined in claim 20, wherein said actuator means includes a stepper motor.

22. The system defined in claim 20, wherein said actuator means includes an axial lead screw connected to said valve member and a stepper motor driving said lead screw.

23. The control system defined in claim 20, wherein said transducer housing means is disposed remotely from said base means.

24. The control system defined in claim 20, wherein said transducer housing means is disposed remotely from said base means; and, said pressure chamber is connected to said differential pressure sensing means by flexible conduit means.

25. The control system defined in claim 20, wherein said base means comprises a valve block and said means defining said orifice comprises a plate attached to said valve block, said plate having a first pressure tap formed therein on the upstream side of said orifice and a second pressure tap on the downstream side thereof.

26. The system defined in claim 20, wherein said means defining said flow measuring orifice comprises a plate member disposed in contact with said base means.

27. The system defined in claim 20, wherein said pressure transducer pressure responsive means includes a flexible diaphragm having a non-magnetic plate attached thereto for movement therewith.

28. The system defined in claim 20, wherein said pressure transducer pressure responsive means includes a non-magnetic metallic plate means attached thereto for movement therewith; and, said inductance means comprises a coiled conductor disposed spaced closely adjacent said plate member.

29. The system defined in claim 20, wherein said sensing circuit means and said driver circuit means are disposed in said housing means.

* * * * *